Patented Apr. 30, 1946

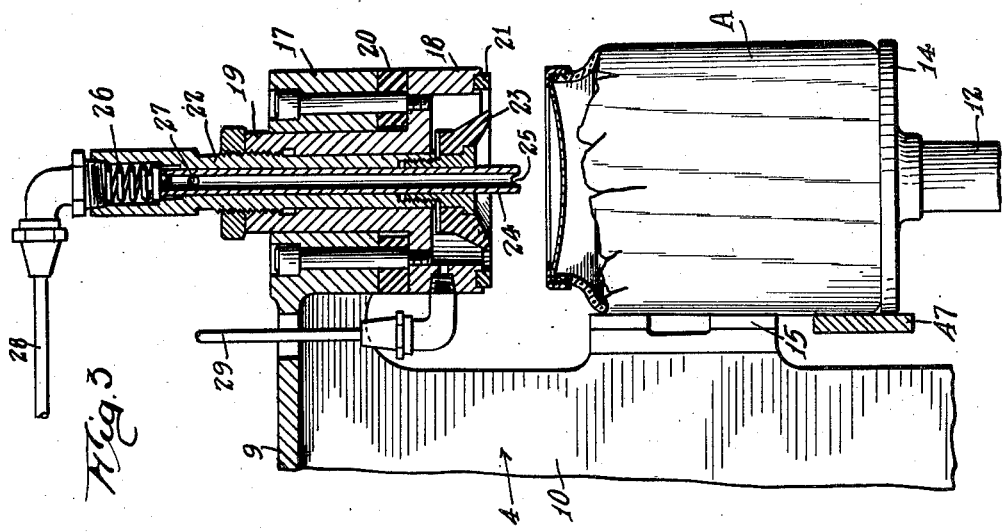
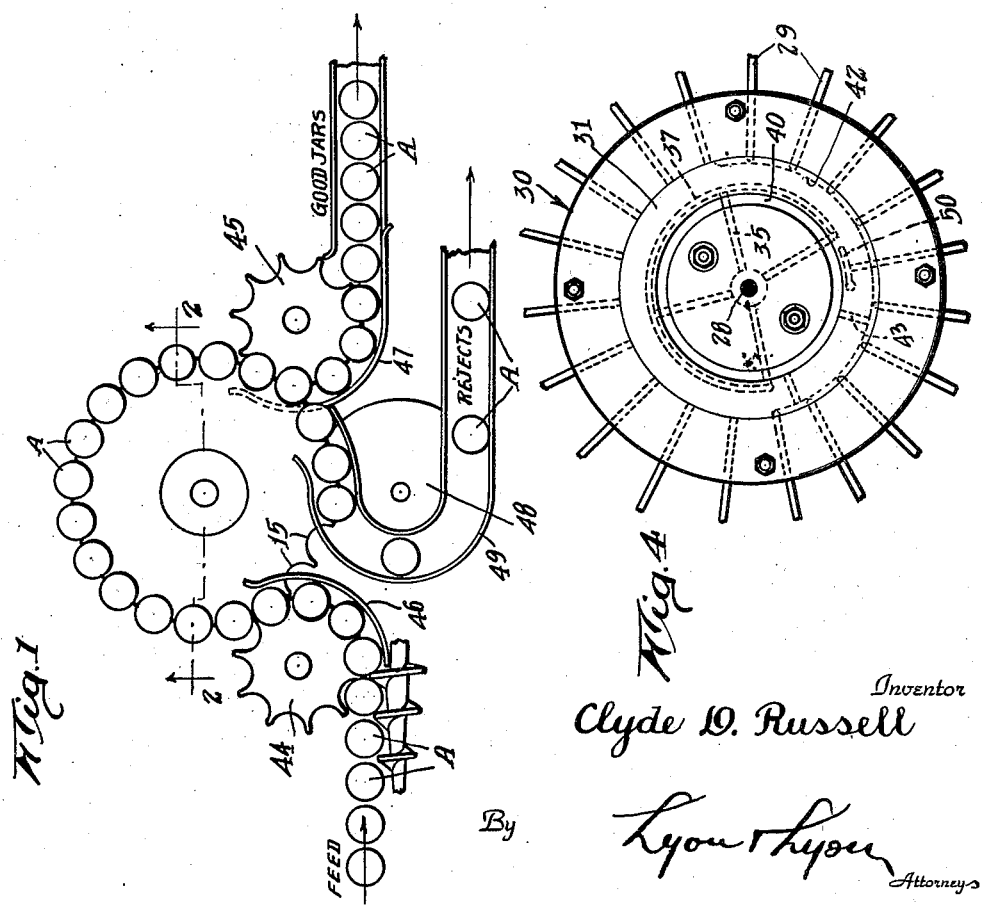

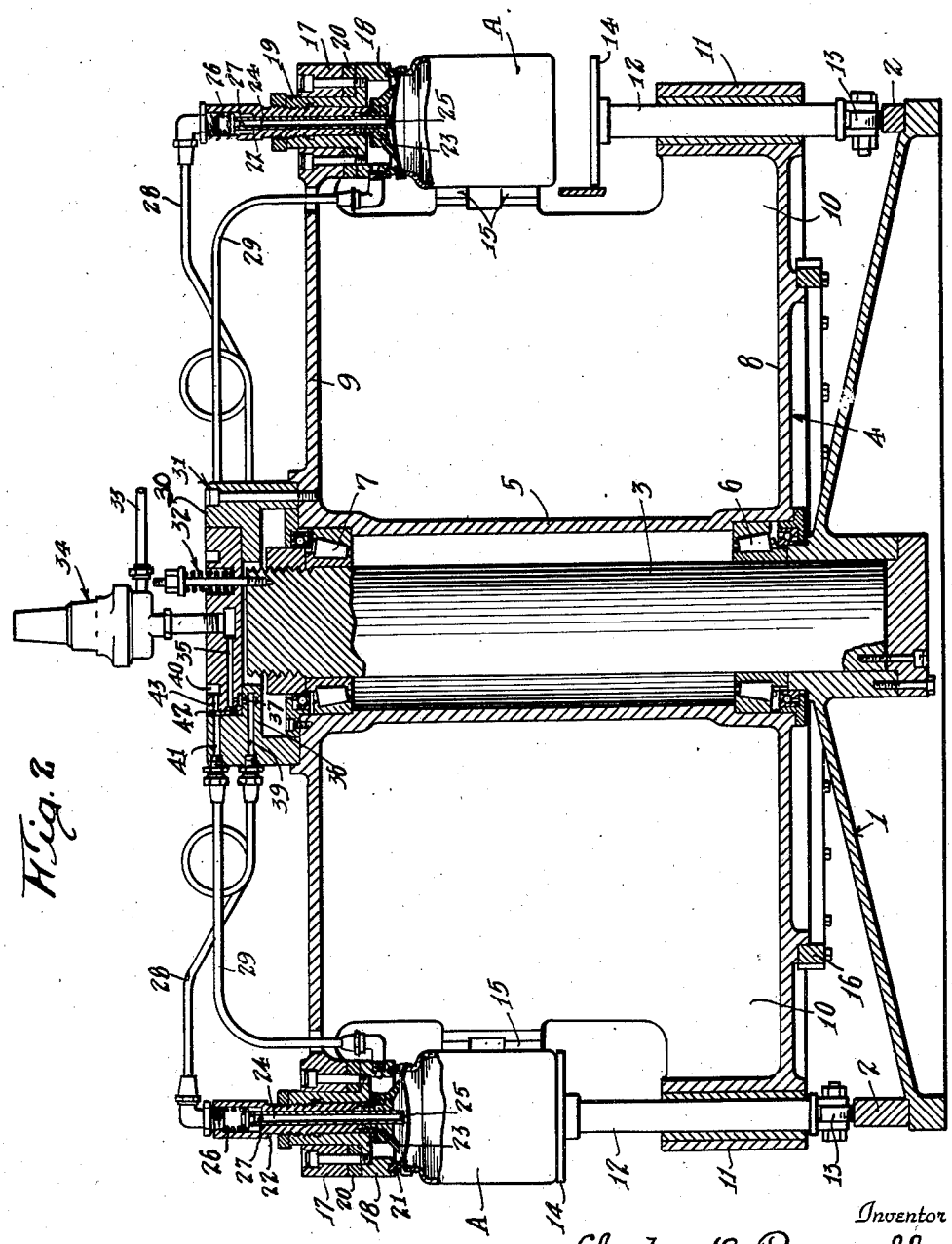

2,399,391

UNITED STATES PATENT OFFICE 2,399,391

CAN TESTING AND SELECTING DEVICE

Clyde D. Russell, Oakland, Calif., assignor to California Packing Corporation, San Francisco, Calif., a corporation of New York Application March 2, 1945, Serial No. 580,679

10 Claims. (Cl. 73—43)

My invention relates to can testing and selecting devices, and among the objects of my invention are:

First, to provide a can testing and selecting device which may be incorporated as a link or element in otherwise conventional can processing equipment and which is sensitive to the shape of the end of the can, that is, whether or not the end is convex or concave, to reject or to accept the can.

Second, to provide a device of this character which subjects the end of the can to a predetermined vacuum pressure, thereby to cause bulging or convexing of the end of the can in the event the internal pressure is above normal.

Third, to provide a device of this character, which may be employed to test the lids or covers of glass jars as well as containers made entirely of metal.

Fourth, to provide a device of this class which, should the pressure within the can or jar exceed a predetermined value, holds the can or jar clear of a deflecting element which normally functions to divert such cans or jars into the succeeding unit of the processing apparatus and later deposits the cans or jars in position for transfer to another unit for disposal or further inspection.

With the above and other objects in view as may appear hereinafter, reference is directed to the accompanying drawings in which:

Fig. 1 is a diagrammatical view of a can conveyor structure forming a part of the processing system with my can testing and selecting device incorporated therein.

Fig. 2 is an enlarged sectional view of my device taken through 2—2 of Fig. 1, showing a normal or "good" can and an abnormal or "bad" can and their effects on the device.

Fig. 3 is a further enlarged fragmentary view of one of the can handling units.

Fig. 4 is a fragmentary plan view of the central portion of the device showing particularly the valve structure whereby the several can selecting and handling units are connected at appropriate times with a vacuum line or vented to atmosphere.

My device is mounted on a circular base structure 1 the periphery of which is provided with a cam ring 2. The central portion of the base structure supports a post 3 which journals a wheel structure 4.

The wheel structure comprises a hub 5 which is journaled on the post 3 by means of upper and lower bearings 7 and 6, respectively. A bottom plate 8 and a top plate 9 project from the ends of the hub 5 and are joined by vertical webs 10.

The bottom plate 8 is equipped at its periphery with a series of equally spaced sleeves 11 in which reciprocate lifter shafts 12. Each shaft 12 is provided with a roller 13 at its lower end adapted to ride on the cam ring 2 and is provided with a platform 14 at its upper end adapted to support a can or jar A.

The webs 10 carry a series of radially directed can-receiving yokes 15 adapted to embrace the cans A and aid in positioning the cans in centered relation on the platforms 14. A drive gear 16 is secured to the bottom plate 8 and is connected to any suitable means for causing rotation of the wheel structure.

The upper or top plate 9 is provided with a series of mounting rings 17 disposed in vertical alignment with the platforms 14. Secured to each mounting ring 17 is a selector head 18 which is in the form of an inverted cup-shaped member with an upwardly directed central stem 19 extending through the mounting ring 17. Compensator rings 20 of rubber or the like are interposed between the selector heads and their mounting rings, so as to permit limited vertical displacement of the selector heads. The lower periphery of each selector head 18 is provided with an outer seal ring 21 formed of rubber or the like and designed to engage the margins of a jar lid or the periphery of a can.

The stem 19 of each selector head receives a sleeve 22 the lower end of which is provided with an inner seal ring 23. The inner seal ring is essentially frusto-conical to provide an annular tapering lip normally positioned in approximately the same plane as the outer seal ring 21. A tube 24 is slidably mounted in each sleeve 22. The lower end of each tube 24 is notched to form an intake port or opening 25. The upper end of each sleeve 22 is enlarged and its tube 24 projects therein and is provided with a head engaged by a spring 26 so that the lower end of the tube 24 normally projects below the seal rings 21 and 23. Near the upper end the tube 24 is provided with a lateral valve port 27 which is exposed to the enlarged upper end of the sleeve 22 when the tube 24 is raised against the action of the spring 26.

The upper end of each sleeve 22 communicates with a vacuum line 28. The chamber formed within each selector head 18 is connected to an atmosphere line 29. The vacuum lines 28 and atmosphere lines 29 extend laterally inward from their respective sleeves and selector heads to a ring valve casing 30 mounted on the top plate 9. Within the valve casing 30 is a disc valve 31 which is secured to the post 3 to restrain it against rotation, that is, the disc valve remains fixed while the casing 30 rotates therearound. Several bolt and spring assemblies 32, one of which is shown in Fig. 2, constitute the connections between the disc valve 31 and the post 3 and serve also to maintain a bearing pressure between the lower face of the disc valve and the ring valve casing, said casing being provided with an annular shoulder on which the periphery of the disc valve rests.

A vacuum supply line 33 is connected to the center of the disc valve 31 preferably through a pressure regulating valve 34. Radiating ports 35 extend from the center of the disc valve to points over the internal flange 36 of the ring valve casing. As shown best in Fig. 4, the ports 35 communicate with an arcuate vacuum channel 37 occupying approximately three-fourths of the periphery of the disc valve and facing the internal flange 36. The vacuum lines 28 communicate with ports 39 which extend into the internal flange 36 and communicate during their rotation with the vacuum channel 37.

The upper face of the disc valve 31 is provided with an annular air intake channel 40 which communicates by radiating ports 41 with a peripheral groove 42 occupying approximately half the disc valve and confronting the ring valve casing 30. The atmosphere lines at 29 communicate by ports 43 during their rotation with the peripheral groove 42.

My can testing and selecting device is mounted so as to receive the cans or jars from a conventional feeder wheel 44 and deliver them to another conventional receiver wheel 45. Guide arms 46 and 47 deflect the cans to and from the feeder wheel 44 and receiver wheel 45. In the diagrammatical view in Fig. 1, the feeder and receiver wheels 44 and 45 are shown displaced approximately 120° apart and located between these wheels is a second receiver wheel 48 and its deflector arm 49.

Operation of my device is as follows: The cans, jars, or similar containers, if they are in proper condition, will have a concave upper end due to a partial vacuum within the container. After each can has been received by the wheel structure 4 it is lifted by the cam ring 3 into engagement with the outer seal ring 21 of the corresponding selector head. During a portion of its travel from the feeder wheel 44 to the receiver wheel 45, the atmosphere line 29 is closed and the vacuum line 28 is connected to the vacuum supply.

If the cover is initially concave as shown in the left-hand side of Fig. 2 and also in Fig. 3, the inner seal ring will clear the end of the container, subjecting both the inner compartment defined by the interior of the inner seal ring 23 and the outer compartment or annular space between the two seal rings to vacuum pressure. This pressure is so regulated that if the internal pressure of the container is above a predetermined value, the lid or end will be caused to assume a convex shape as shown at the right-hand side of Fig. 2, isolating the space within this ring from the annular space between the seal rings 23 and 21. However, if the pressure within the container is proper, the clearance under the seal ring 23 is maintained and the inner and outer compartments remain in communication.

As the containers move near the receiver wheel 45 the atmosphere line 29 is opened to atmosphere, relieving the vacuum pressure in both the inner and outer compartments unless the end of the can is convex and engaged by the inner seal ring 23. At this point the platform is lowered by reason of a depression in the cam 2.

If the container end is concave the container drops away from the head and in position for engagement by said guide arm 47 and receiver wheel 45.

If the container is convex and still suspended by reason of the vacuum within the inner compartment, the bottom of the container clears the guide arm 47 as shown in Fig. 3, and is carried thereover.

After the container so held has moved beyond the deflector arm 47 the vacuum line 28 is brought into communication with an atmosphere port designated 50 in Fig. 4, completely relieving the vacuum in the inner compartment so that a can with a convex end drops from the inner seal ring onto the platform. At this stage the platform may have raised so that the container need drop only a short distance. Such can is then engaged by the second deflector arm 49 and delivered to the receiver wheel 48 from which it passes to additional conveyor means (not shown) for rejection or further inspection.

In the event that the platform does not contain a can or jar, the tube 24 is urged by the spring 26 to its lower position shown in Fig. 3, shutting off the connection with the vacuum line so that the selector head remains inoperative during rotation of the wheel. Also, between the time that the can is delivered to the receiver wheel 45 or 48 as the case may be, and the time a new container is supplied, the tube 24 occupies its lower position, closing off the vacuum line.

Many other embodiments of the invention may be resorted to without departing from the spirit of the invention.

I claim:

1. A container testing and selecting device comprising: a head unit including an outer sealing ring and an inner sealing ring positioned to engage the periphery and central portion of a convex container end to define therewith isolated sealing chambers, said inner ring adapted to clear said container end, if concave, to connect said sealing chambers; and a valve structure controlling communication with said chambers to subject during a preselected interval one of said chambers to sub-atmospheric pressure while said container is in sealing engagement with said outer ring, and thereafter breaking the seal of the other of said chambers whereby said container remains attached if said inner ring is in engagement with said container end and is freed if said inner ring clears said container end.

2. A container testing and selecting device comprising: a head unit including an outer sealing ring and an inner sealing ring positioned to engage the periphery and central portion of a convex container end to define therewith isolated sealing chambers, said inner ring adapted to clear said container end, if concave, to connect said sealing chambers; a mounting structure for a plurality of said units; means for positioning containers under said units for engagement therewith; means for subjecting one of said chambers to sub-atmospheric pressure while said chambers are sealed against a container thereby to apply a counter-pressure tending to cause convexing of said container end into engagement with said inner seal ring, should the pressure within said container exceed a critical value, and isolate said chambers; and means for breaking the seal of the other chamber whereby said container adheres to said head unit if said container is sealed to said inner ring and is freed therefrom if said container end is concave.

3. A container testing and selecting device comprising: a head unit including an outer sealing ring and an inner sealing ring positioned to engage the periphery and central portion of a convex container end to define therewith isolated sealing chambers, said inner ring adapted to clear said container end, if concave, to connect said sealing chambers; a slidable tubular plunger carried by said head unit, extending into one of said chambers and adapted to engage container ends brought into engagement with said head unit; valve means incorporating said plunger having a normally closed position and adapted to be opened by a container engaging said head and plunger; and a selector valve structure including means operable through said plunger and valve means to subject said chamber to sub-atmospheric pressure while said container is in engagement with said outer seal ring; and means thereafter operable to bleed the other of said chambers whereby said container remains attached or is freed from said head depending on engagement of said inner seal ring with said container end.

4. A construction as set forth in claim 3, which comprises further: a mounting structure for a plurality of said head units; means for positioning containers under said units for engagement therewith; a device for engaging containers freed from said head units, but positioned to clear containers attached to said other head units; said valve structure including vent means for both of said chambers positioned to free containers after clearing said device; and a second device for removing said containers when freed by said vent means.

5. A container testing and selecting device, comprising: a head unit defining a sealing chamber engageable with the periphery of a container end; a sealing ring within said chamber positioned to engage a convex container end to divide said chamber into inner and outer compartments and clear concave container ends to connect said compartments; means operable through one of said compartments for evacuating one or both of said compartments depending on engagement of said sealing ring with said container end; and means operable thereafter to break the seal of the other compartment whereby in the event said container end is convex it remains attached, or if concave, said container is freed therefrom.

6. A construction as set forth in claim 5, wherein said evacuating means incorporates a slidable container engaging plunger and a valve element controlled thereby to occupy a closed position unless a container engages said plunger and said head unit.

7. A container testing and selecting device, comprising: a head unit defining a seal chamber engageable with a container end; means within said seal chamber positioned for engagement with a convex container end to divide said seal chamber into compartments and clear a concave container end to connect said compartments; valve means controlling each of said compartments, said valve means operable in sequence first to subject one of said compartments to sub-atmospheric pressure thereby to adhere said container by its end to said head, then to bleed the other of said compartments to release said container unless its end be convex and isolating said compartments, and thereafter to bleed said one compartment to release a container otherwise held by reason of its convex end.

8. A construction as set forth in claim 7, which further comprises: a mounting structure for a plurality of head units; container supporting elements carried by said mounting structure for moving containers into engagement with said head units; a first and second container removing means positioned to engage respectively cans with concave ends and with convex ends upon their respective release from said head units.

9. A container testing and selecting device, comprising: a head unit defining a seal chamber engageable with a container end; means within said seal chamber positioned for engagement with a convex container end to divide said seal chamber into compartments and clear a concave container end to connect said compartments; valve means controlling each of said compartments, said valve means operable in sequence first to subject one of said compartments to sub-atmospheric pressure thereby to adhere said container by its end to said head, then to bleed the other of said compartments to release said container unless its end be convex and isolating said compartments, and thereafter to bleed said one compartment to release a container otherwise held by reason of its convex end; and an instrumentality normally rendering the sub-atmospheric pressure connection of said valve means inoperative, said instrumentality being engageable by a container moving into sealing engagement with said head unit to render said valve means operative.

10. A construction as set forth in claim 9, which further comprises: a mounting structure for a plurality of head units; container supporting elements carried by said mounting structure for moving containers into engagement with said head units; a first and second container removing means positioned to engage respectively cans with concave ends and with convex ends upon their respective release from said head units.

CLYDE D. RUSSELL.